United States Patent [19]
Capurso

[11] Patent Number: 6,041,188
[45] Date of Patent: *Mar. 21, 2000

[54] MULTI-POSITION FLASH WITH SHUTTER ACTUATOR OPERABLE IN EACH POSITION ON COMPACT CAMERA

[75] Inventor: Robert G. Capurso, Bergen, N.Y.

[73] Assignee: Eastman Kodak Company, Rochester, N.Y.

[ * ] Notice: This patent is subject to a terminal disclaimer.

[21] Appl. No.: 09/078,068

[22] Filed: May 13, 1998

[51] Int. Cl.[7] ............................ G03B 15/03; G03B 17/38; H04N 5/225
[52] U.S. Cl. ............................ 396/178; 396/502; 348/375
[58] Field of Search .................................. 396/155, 175, 396/176, 177, 178, 263, 266, 439, 502; 348/207, 371, 373, 375; 359/909.1, 906; 362/3, 18

[56] References Cited

U.S. PATENT DOCUMENTS

| | | | |
|---|---|---|---|
| 4,106,037 | 8/1978 | Nakamura et al. | 396/178 |
| 4,208,113 | 6/1980 | Prochnow | 396/502 X |
| 4,221,477 | 9/1980 | Prochnow et al. | 396/502 X |
| 4,441,801 | 4/1984 | Mashimo et al. | 396/406 |
| 5,036,345 | 7/1991 | Kawano | 396/176 X |
| 5,107,287 | 4/1992 | Swayze | 396/178 X |
| 5,276,474 | 1/1994 | Dassero | 396/178 |
| 5,436,686 | 7/1995 | Walsh | 396/535 |

*Primary Examiner*—Safet Metjahic
*Assistant Examiner*—J. K. Han
*Attorney, Agent, or Firm*—Roger A. Fields

[57] ABSTRACT

A camera including a housing, a dual position flash pivotable between a folded position against the housing and an unfolded position extending from the housing, a taking lens, a shutter blade movable to momentarily uncover the taking lens in order to take a picture, and a shutter actuator manually depressible to initiate movement of the shutter blade, is characterized in that the shutter actuator is located on the flash to be pivoted with the flash and is manually depressible in the folded and unfolded positions of the flash to initiate movement of the shutter blade in each one of the positions.

11 Claims, 4 Drawing Sheets

MULTI-POSITION FLASH WITH SHUTTER ACTUATOR OPERABLE IN EACH POSITION ON COMPACT CAMERA

CROSS REFERENCE TO RELATED APPLICATIONS

Reference is made to commonly assigned copending applications Ser. No. 09/078,126, entitled PIVOTAL FLASH WITH PIVOT ACTUATOR IN COMPACT CAMERA and filed May 13, 1998 in the name of Robert G. Capurso, and Ser. No. 09/078,121, entitled MOVABLE FLASH WITH BUILT-IN ACTUATOR FOR SHUTTER RELEASE BUTTON IN COMPACT CAMERA and filed May 13, 1998 in the name of Robert G. Capurso.

FIELD OF THE INVENTION

The invention relates generally to the field of photography, and in particular to a camera with a multi-position flash.

BACKGROUND OF THE INVENTION

It is generally known for a camera to include a housing, a dual position flash pivotable between a folded position against the housing and an unfolded position extending from the housing, a taking lens, a shutter blade movable to momentarily uncover the taking lens in order to take a picture, and a shutter actuator manually depressible to initiate movement of the shutter blade. Typically, the shutter actuator is located on the housing.

The Cross-Referenced Applications

Cross-referenced application Ser. No. 08/078,126 discloses a compact camera comprising a housing, and a pivotal flash that can be pivoted between a folded position against the housing and an unfolded position extending from the housing. The housing has a pair of elongate surfaces that come together to define a corner portion. The pivotal flash is pivotally supported beneath the corner portion and has a pivot actuator that is located to be swung around the corner position from over one of the surfaces to over the other surface in order to pivot the pivotal flash from the folded position to the unfolded position.

Cross-referenced application Ser. No. 08/078,121 discloses a compact camera comprising a housing, a manually depressible shutter release button, and a movable flash supported for movement between a folded position against the housing and covering the shutter release button and an unfolded position extending from the housing and not covering the shutter release button. The movable flash has a built-in actuator for the shutter release button which covers the shutter release button when the movable flash is in its folded position, but can be manually depressed sufficiently to similarly depress the shutter release button.

SUMMARY OF THE INVENTION

A camera comprising a multi-position flash movable to separate positions, a taking lens, a shutter blade movable to momentarily uncover the taking lens in order to take a picture, and a shutter actuator manually depressible to initiate movement of the shutter blade, is characterized in that:

the shutter actuator is located on the flash and is manually depressible in at least more than one of the positions of the flash to initiate movement of the shutter blade.

DETAILED DESCRIPTION OF THE INVENTION

Figure 1:
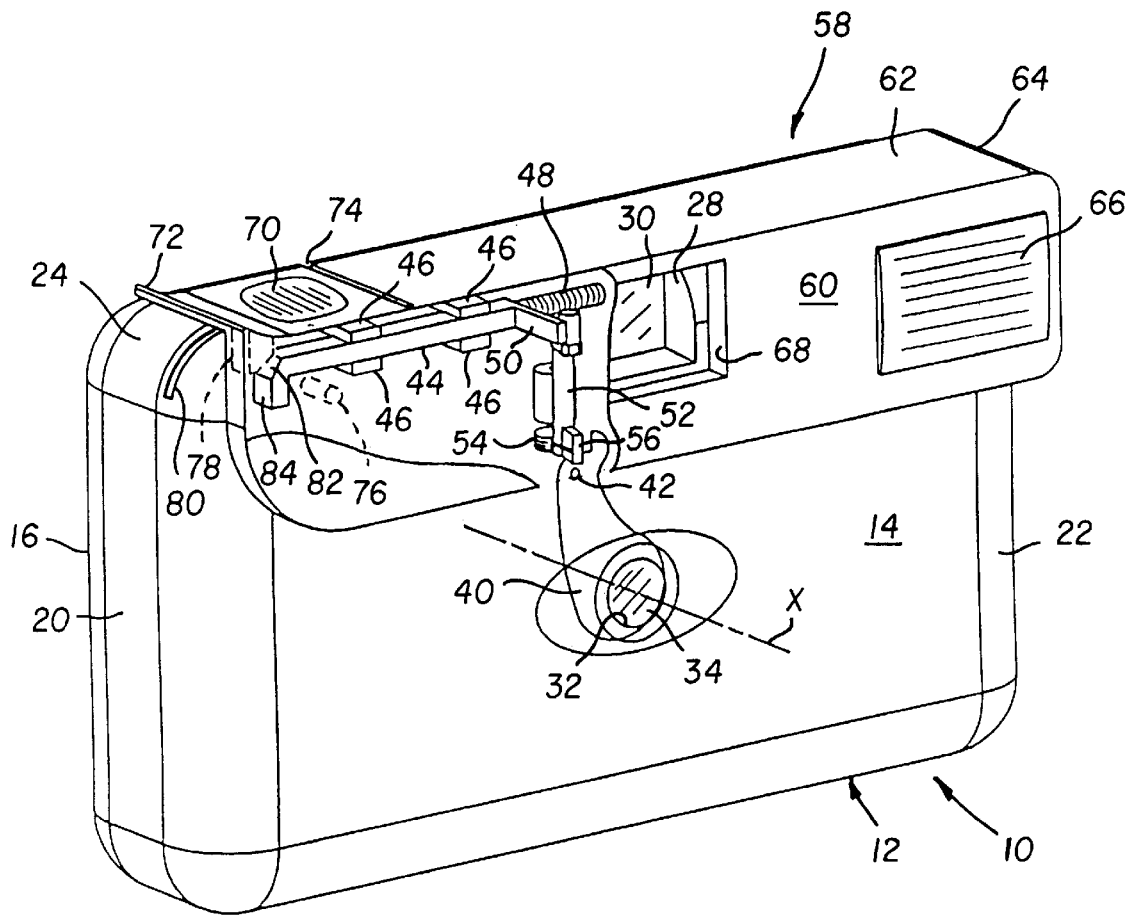
FIG. 1 is a top left-side front perspective view of a compact camera with a dual position flash according to a preferred embodiment of the invention, showing the flash in a folded position.

The invention is disclosed as being embodied preferably in a compact camera with a dual position flash. Because the features of a compact camera with a dual position flash are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 show a compact camera including a housing 12 provided with front and rear surfaces 14 and 16, a top surface 18, and side or end surfaces 20 and 22. The top surface 18 and the side surface 20 come together to define one corner portion 24 of the housing 12. The top surface 18 and the side surface 22 come together to define another, opposite corner portion 26 of the housing 12. The front surface 14 has a front viewfinder opening 28 for a front viewfinder lens 30 and has a front lens opening 32 for a taking lens 34. An optical axis for the taking lens 34 is designated "X" in FIGS. 1, 3 and 4. The rear surface 16 has a rear viewfinder opening 36 for a rear viewfinder lens 38. One looks through the front and rear viewfinder lenses 30 and 38 to frame a subject to be photographed.

A known type shutter blade 40 is supported on a pivot pin 42 for pivotal opening and closing movement to momentarily uncover and recover the taking lens 34 in order to take a picture. A torsion return spring (not shown) continuously urges the shutter blade 40 to recover the taking lens 34. A shutter trigger 44 is supported via fixed supports 46 for translation slightly to the right in FIG. 1 and slightly to the left in FIGS. 3 and 4, against the continuous contrary urging of a compression return spring 48, to make a right-angle tab 50 on the shutter trigger rotate a known type high energy impacter 52 slightly counter-clockwise in FIGS. 1, 3 and 4 from a fixed stop (not shown). The fixed stop normally holds the high energy impacter 52 in place. When the high energy impacter 52 is rotated free of the fixed stop (not shown), a torsion drive spring 54 rotates the high energy impacter further counter-clockwise in FIGS. 1, 3 and 4 to move a right-angle tab 56 on the high energy impacter quickly against the shutter blade 40. This pivots the shutter blade 40 to momentarily uncover the taking lens 34. As the shutter blade 40 pivots, the right-angle tab 56 is moved from the shutter blade 40. Then, the torsion return spring (not shown) reverses the shutter blade 40 to recover the taking lens 34.

As shown in FIGS. 1–4, a pivotal electronic flash 58 includes a relatively thin front wall 60 that is similar in shape to the front surface 14 of the housing 12, a relatively thin top/side wall 62 that is substantially perpendicular to the front wall and is similar in shape to the top surface 18 of the housing, and a flash emission head 64 having a flash emission lens 66. The front wall 60 of the pivotal flash 58 has a front viewfinder opening 68. The top/side wall 62 of the pivotal flash 58 has an integral shutter actuator 70 for the shutter trigger 44 and a slightly curved end portion that serves as a pivot actuator 72. A slit 74 is cut in the top/side wall 62, alongside the shutter actuator 70, to permit the shutter actuator to be manually depressed and to resiliently recover its original shape when released.

Figure 2:
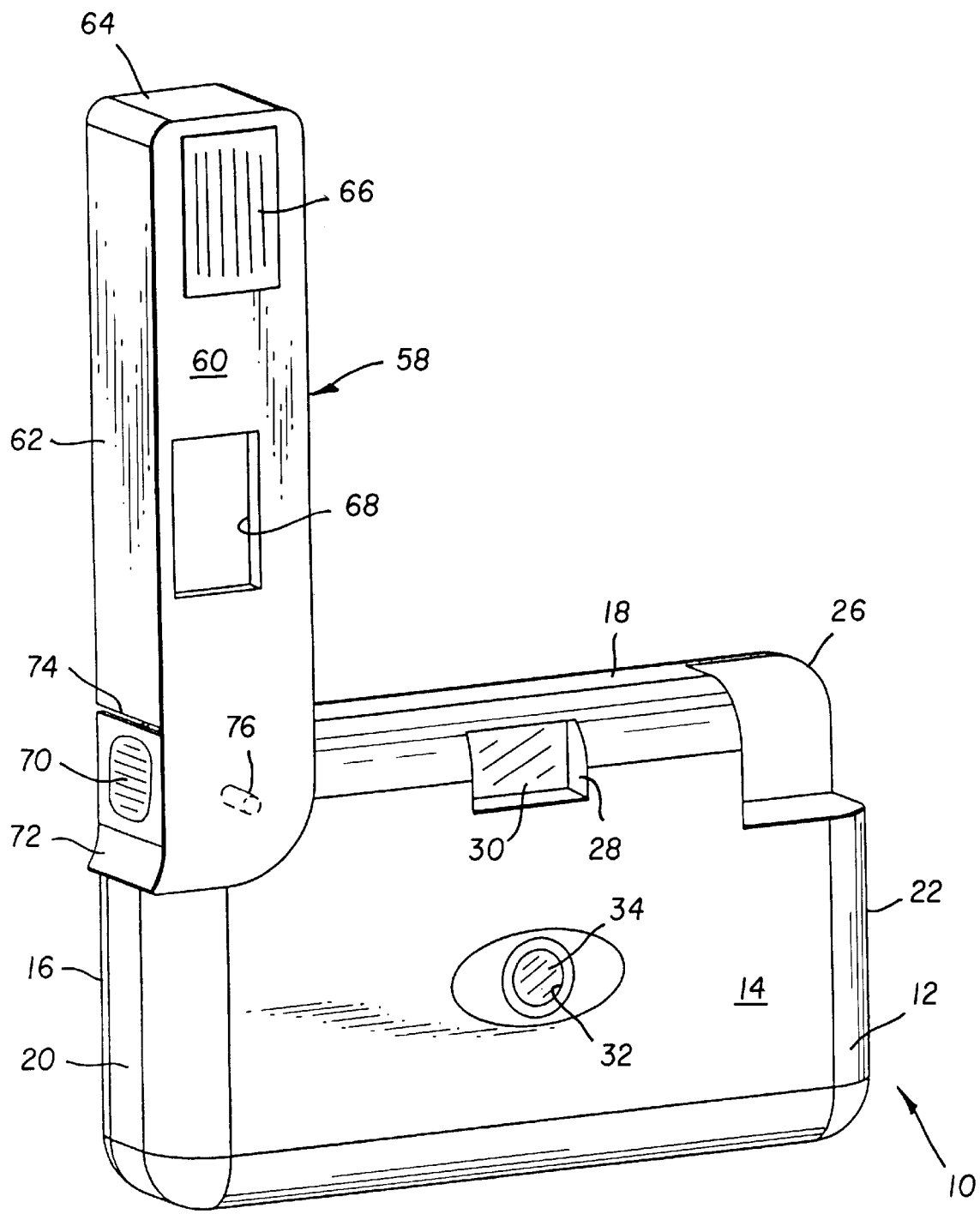
FIG. 2 is a top left-side front perspective view of the compact camera, showing the flash in an unfolded position.
Figure 3:
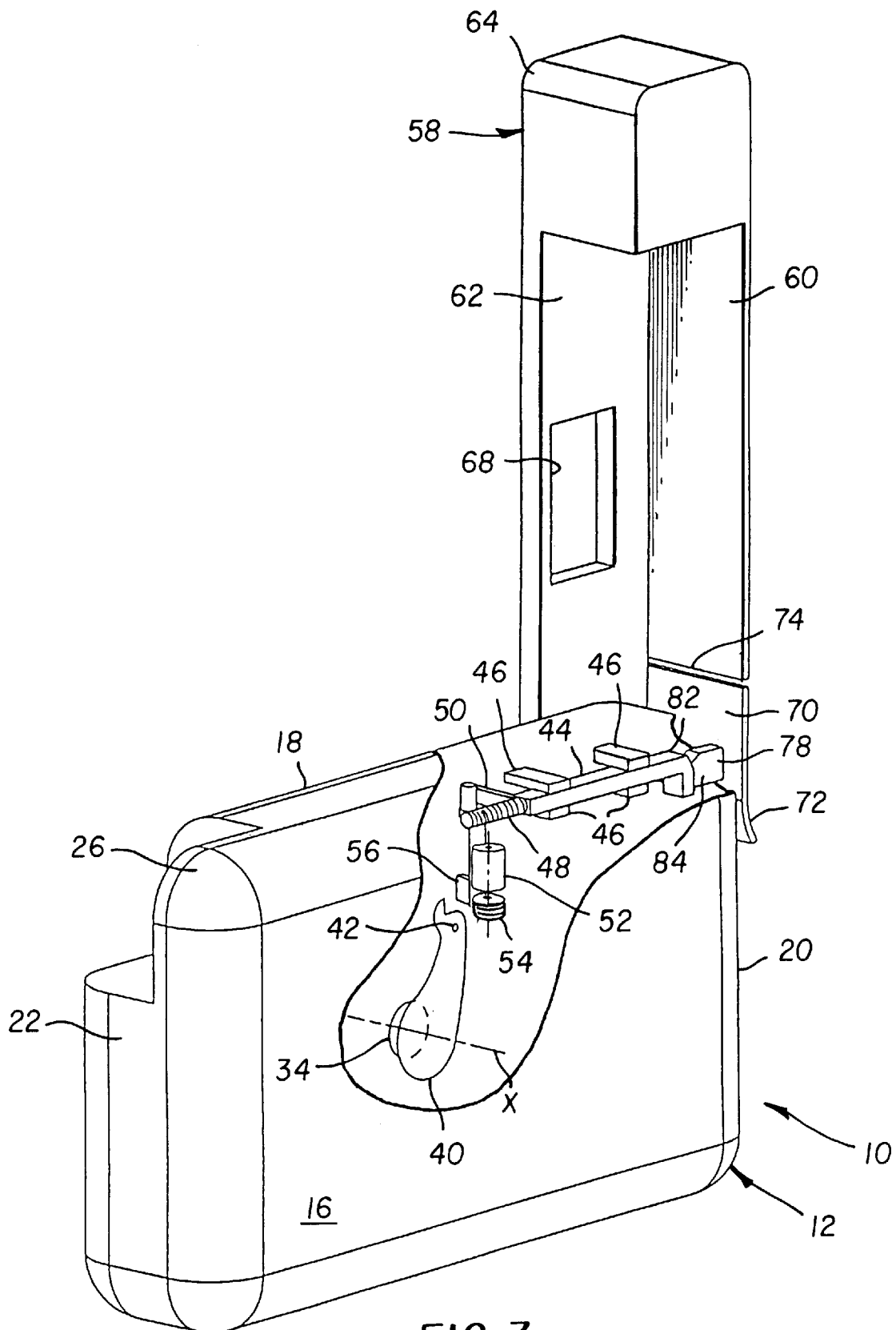
FIG. 3 is a top right-side rear perspective view of the compact camera, showing the flash in its unfolded position.
Figure 4:
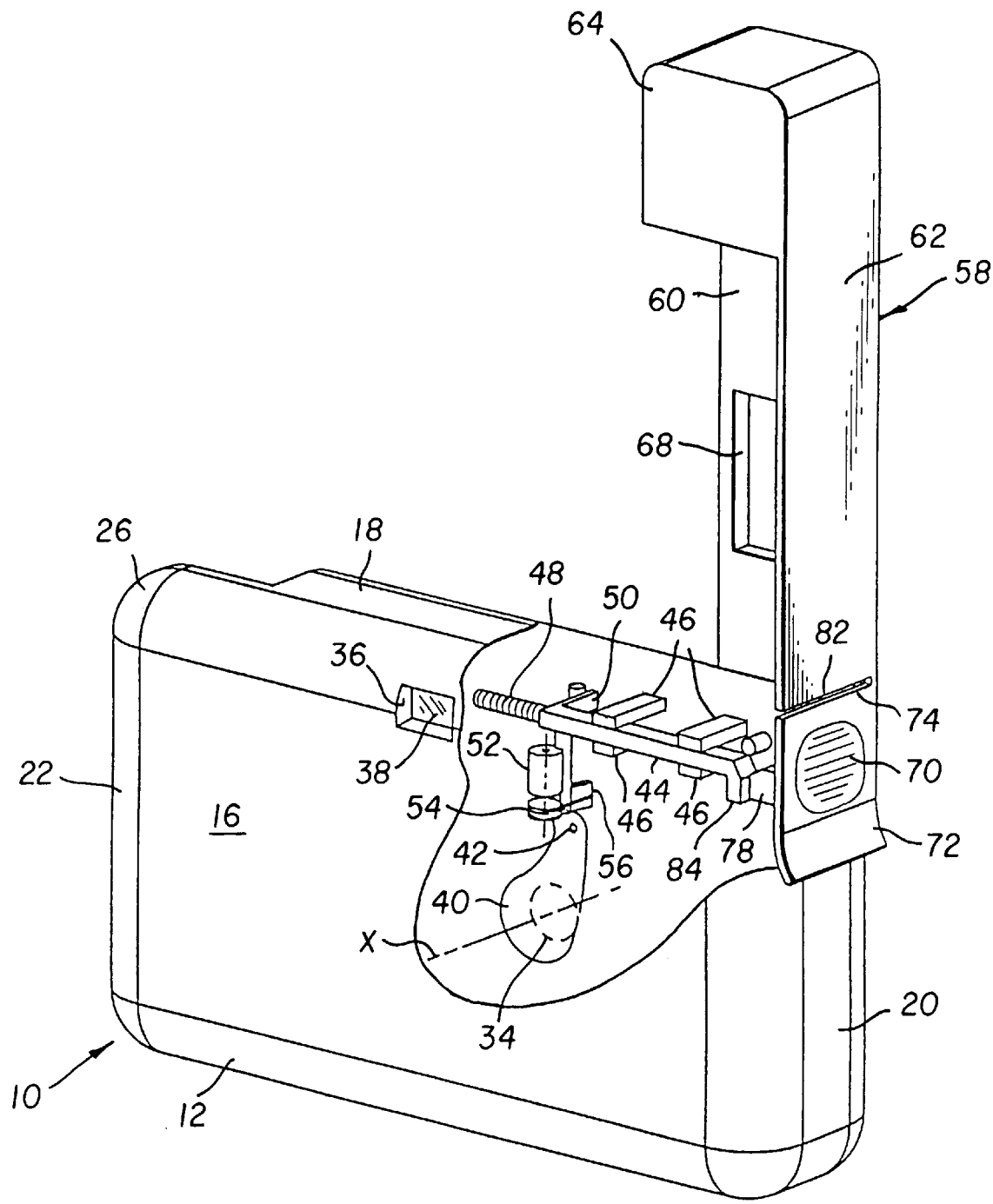
FIG. 4 is a top left-side rear elevation view of the compact camera, showing the flash in its unfolded position.

A pivot pin 76 pivotally supports the pivotal flash 58, beneath the corner portion 24 of the housing 12, for pivotal movement between a folded position shown in FIGS. 1, 3 and 4 and an unfolded position shown in FIG. 2. In the folded position, the front viewfinder opening 68 in the front wall 60 of the pivotal flash 58 is over the front viewfinder opening 28 in the front surface 14 of the housing 12, the flash emission head 64 is located adjacent the corner portion 26 of the housing, the pivot actuator 72 is gradually inclined away from the corner portion 24 of the housing to create an increasing space between the pivot actuator and that corner portion, and a protuberance 78 integrally projects from the underside of the shutter actuator 70 through a light-trapping slot 80 in the corner portion 24 of the housing.

When the pivotal flash 58 is in its folded position shown in FIG. 1, manual depression of the shutter actuator 70 forces the protuberance 78 against a trigger surface or beveled edge 82 of the shutter trigger 44. This causes the shutter trigger 44 to be translated slightly to the right in FIG. 1, against the continuous contrary urging of the compression return spring 48, to make the right-angle tab 50 on the shutter trigger rotate the high energy impacter 52 slightly counter-clockwise in FIG. 1, from the fixed stop (not shown) and allow the torsion drive spring 54 to rotate the high energy impacter further counter-clockwise in FIG. 1 to move the right-angle tab 56 on the high energy impacter quickly against the shutter blade 40 and pivot the shutter blade 40 to momentarily uncover the taking lens 34.

When the pivotal flash 58 is in the unfolded position shown in FIGS. 3 and 4, the pivotal flash stands erect with the flash emission head 64 elevated from the corner portion 24 of the housing 12. In this instance, manual depression of the shutter actuator 70 forces the protuberance 78 against a trigger surface or non-beveled end edge 84 of the shutter trigger 44. This causes the shutter trigger 44 to be translated slightly to the left in FIGS. 3 and 4, against the continuous contrary urging of the compression return spring 48, to make the right-angle tab 50 on the shutter trigger rotate the high energy impacter 52 slightly counter-clockwise in FIGS. 3 and 4 from the fixed stop (not shown) and allow the torsion drive spring 54 to rotate the high energy impacter further counterclockwise in FIGS. 3 and 4 to move the right-angle tab 56 on the high energy impacter quickly against the shutter blade 40 and pivot the shutter blade 40 to momentarily uncover the taking lens 34.

To pivot the pivotal flash 58 from the folded position to the unfolded position, the pivot actuator 72 can be manually depressed to swing the pivot actuator around the corner portion 24 of the housing 12 from over the top surface 18 of the housing to over the side surface 20 of the housing.

The invention has been described with reference to a preferred embodiment. However, it will be appreciated that variations and modifications can be effected by a person of ordinary skill in the art without departing from the scope of the invention.

PARTS LIST 10. compact camera
12. housing
14. front elongate surface
16. rear elongate surface
18. top elongate surface
20. side elongate surface
22. side elongate surface
24. corner portion
26. corner portion
28. front viewfinder opening
30. front viewfinder lens
32. front lens opening
34. taking lens
X. optical axis
36. rear viewfinder opening
38. rear viewfinder lens
40. shutter blade
42. pivot pin
44. shutter trigger
46. fixed supports
48. compression return spring
50. right-angle tab
52. high energy impacter
54. torsion drive spring
56. right-angle tab
58. pivotal flash
60. front wall
62. top/side wall
64. flash emission head
66. flash emission lens
68. front viewfinder opening
70. shutter actuator
72. pivot actuator
74. slit
76. pivot pin
78. protuberance
80. light-trapping slot
82. trigger surface
84. trigger surface

What is claimed is:

1. A camera comprising a multi-position flash movable to separate positions, a taking lens, a shutter blade movable to momentarily uncover said taking lens in order to take a picture, and a shutter actuator manually depressible to initiate movement of said shutter blade, is characterized in that:

said shutter actuator is located on said flash and is manually depressible in at least more than one of said positions of the flash to initiate movement of said shutter blade.

2. A camera as recited in claim 1, wherein a shutter trigger has respective trigger surfaces normally positioned for alternate contact with said shutter actuator, depending on which one of said positions said flash is in, to initiate movement of said shutter blade when the shutter actuator is manually depressed.

3. A camera as recited in claim 2, wherein a housing for said camera has a light-trapping slot located opposite said trigger surfaces, and said shutter actuator includes a protuberance that extends through said slot to contact said trigger surfaces.

4. A camera as recited in claim 1, wherein said shutter actuator is manually depressible in each one of said positions of the flash to initiate movement of said shutter blade.

5. A camera comprising a housing, a dual position flash pivotable between a folded position against said housing and an unfolded position extending from the housing, a taking lens, a shutter blade movable to momentarily uncover said taking lens in order to take a picture, and a shutter actuator manually depressible to initiate movement of said shutter blade, is characterized in that:

said shutter actuator is located on said flash to be pivoted with the flash and is manually depressible in said folded and unfolded positions of the flash to initiate movement of said shutter blade in each one of the positions.

6. A camera as recited in claim 5, wherein said housing has a pair of surfaces that come together to define a corner portion, and said shutter actuator is located on said flash to be swung around said corner portion from adjacent one of said surfaces to adjacent the other surface when the flash is pivoted from said folded position to said unfolded position.

7. A camera as recited in claim 6, wherein an actuatable shutter trigger is located opposite each one of said surfaces to permit said shutter actuator to actuate said shutter trigger when said flash is in said folded and unfolded positions.

8. A camera as recited in claim 7, wherein said housing has a light-trapping slot in said corner portion and each one of said surfaces, and said shutter actuator includes a protuberance that extends through said slot to actuate said shutter trigger when said flash is in said folded and unfolded positions.

9. A method of actuating a shutter blade to momentarily uncover a taking lens in order to take a picture in a camera having a dual position flash pivotable between a folded position against a housing and an unfolded position extending from the housing, comprising the steps of:

moving the flash to its folded position;

manually depressing a shutter actuator on the flash to initiate actuation of the shutter blade with the flash in the folded position;

moving the flash to its unfolded position; and manually depressing the shutter actuator on the flash to initiate actuation of the shutter blade with the flash in the unfolded position.

10. A camera comprising a multi-position flash movable to separate positions, a taking lens, a shutter blade actuatable for uncovering said taking lens in order to take a picture, and a shutter actuator manually depressible to permit actuation of said shutter blade to uncover said taking lens, is characterized in that:

said shutter actuator is located on said flash and is manually depressible in at least more than one of said positions of the flash.

11. A method of actuating a shutter blade to uncover a taking lens in order to take a picture in a camera having a dual position flash pivotable between a folded position against a housing and an unfolded position extending from the housing, comprising the steps of:

moving the flash to its folded position;

manually depressing a shutter actuator on the flash, for actuation of the shutter blade with the flash in the folded position;

moving the flash to its unfolded position; and manually depressing the shutter actuator on the flash, for actuation of the shutter blade with the flash in the unfolded position.

* * * * *